UNITED STATES PATENT OFFICE.

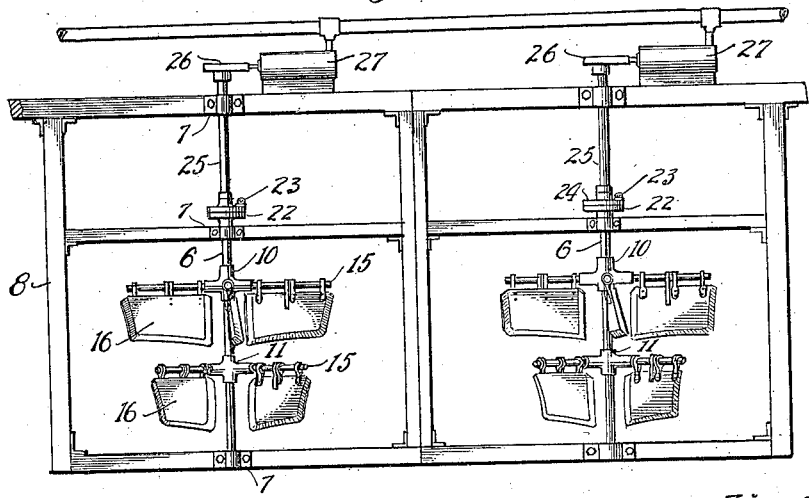
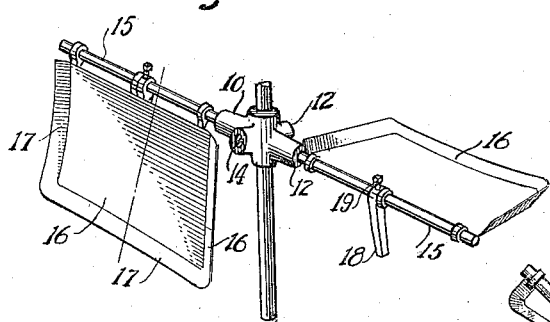
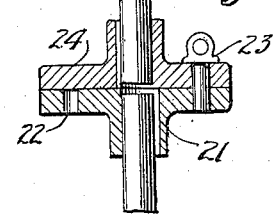
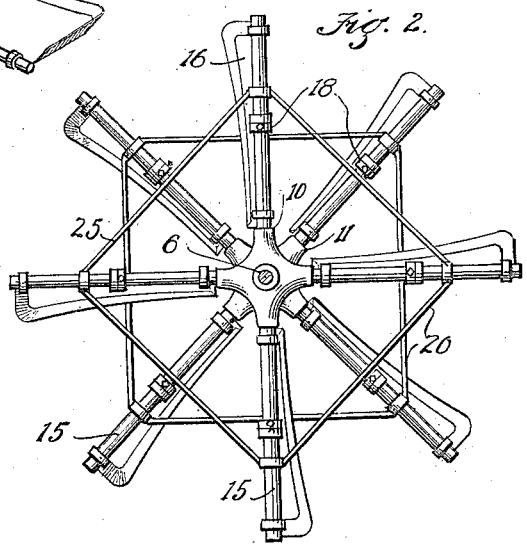
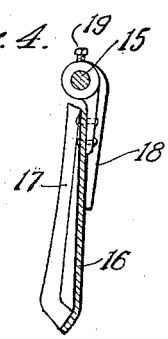

CARL THROCKMORTON, OF MONTEBELLO, AND RAY THROCKMORTON, OF EL MONTE, CALIFORNIA.

WAVE-POWER MECHANISM.

1,173,130. Specification of Letters Patent. Patented Feb. 22, 1916.

Application filed February 18, 1914. Serial No. 819,405.

*To all whom it may concern:*

Be it known that we, CARL THROCKMORTON, a citizen of the United States, residing at Montebello, in the county of Los Angeles, State of California, and RAY THROCKMORTON, a citizen of the United States, residing at El Monte, in the county of Los Angeles, State of California, have invented new and useful Improvements in Wave-Power Mechanisms, of which the following is a specification.

This invention relates to a wave power mechanism, and particularly pertains to the construction of a wave actuated rotor.

It is the object of this invention to provide a mechanism adapted to be actuated by waves or currents to convert the force exerted thereby into mechanical energy, which mechanism is simple and substantial in construction and not liable to get out of order when subjected to abnormal operating forces.

Another object is to provide a rotary wave operated power generating mechanism so constructed as to be operated both by the incoming and outgoing currents of the surf as well as by waves and rotated continuously in one direction thereby, and which will not be retarded by reasons of differential counter currents.

The invention primarily resides in a rotor consisting of a plurality of horizontal radially extending arms and pivoted diagonally curved vanes carried on said arms adapted to be operated by currents flowing in any direction to rotate the rotor only in one direction.

The invention is illustrated in the accompanying drawing, in which: Figure 1 is a view of a battery of the rotors in front elevation, illustrating the application of the invention. Fig. 2 is a plan view of one of the rotors. Fig. 3 is a detail in perspective illustrating the construction of the cross arms of the rotor with the pivoted vanes thereon and showing one of the vanes in its horizontal inoperative position. Fig. 4 is a detail vertical section of one of the vanes on the line 4—4 of Fig. 3. Fig. 5 is a detail section of the means for detachably connecting the rotor shaft to a drive shaft.

More specifically 6 indicates the rotor shaft which is adapted to be supported in suitable bearings 7 on a frame-work 8 of any desired construction and arranged vertically in the path of a stream of water, preferably in the surf where the currents flow in both directions, and where the force of waves can be utilized in revolving the rotor.

Mounted on the shaft 6 are spaced collars 10 and 11 having radially extending bosses 12 formed thereon, which bosses are provided with interiorly threaded sockets 14 for the reception of rigid arms 15 which extend horizontally at right angles to the rotor shaft 6, preferably on four sides thereof, as shown in Fig. 2; the arms 15 on the upper collar 10 being off-set in relation to the arms 15 on the lower collar 11 and extending intermediate thereof. Pivotally mounted on the arms 15 and depending therefrom are vanes or blades 16 which are curved diagonally from their upper inner ends to their outer lower ends as particularly shown in Figs. 3 and 4; the blades 16 being provided with outwardly divergent flanges 17 on their side and lower edges.

Rigidly mounted on the arms 15 and extending rearwardly of the blades 16 are adjustable stops 18 which are held against movement on the arms 15 by screws 19 or in any other suitable manner and extend downwardly therefrom so as to normally dispose the blades 16 in an approximately vertical position. The stops 18 limit the movement of the blades 16 in one direction; the blades being free to swing upwardly from the stops 18, as shown in Fig. 3, which upward movement is limited by suitable diagonal brace rods 20 extending between and connecting the radial arms 15.

Rigidly mounted on the upper end of the rotor shaft 6 is a flanged collar 21 provided with perforations 22 adapted to receive a pin 23 on a corresponding flanged collar 24 carried by a drive shaft 25 arranged in alinement with the rotor shaft 6 and provided with an eccentric or cam 26 adapted to operate the piston of a pump 27 or other mechanism.

In the application of the invention the rotor is placed at such position in the surf as to subject the blades 16 thereon to the action of the incoming and outgoing currents of the surf and also to the force of waves; the incoming currents operating on the blades 16 on one side of the rotor shaft, which blades are those facing the current and held against rearward rocking movement by the stops 18. The outgoing current will act on the blades on the opposite side of the rotor shaft in like manner; the incoming and outgoing currents thus acting to rotate the rotor continuously or intermittently in one direction according to the nature of the currents. By pivoting the blades in the manner described, the blades on the side of the rotor shaft 6 moving against the current will be rocked upwardly so as to offer a minimum resistance in their passage through the water, which blades will gravitate to their vertical position and be acted on by the current when passing to the opposite side of the rotor shaft. This pivotal mounting of the blades also serves to prevent retardation of the rotor due to differential counter currents, which occur on different planes in the surf. By forming the blades with the diagonal curvature, the action of the current thereon will be increased and will present dished surfaces on their outer faces against which waves impact.

The arrangement of the two sets of blades in off-set relation to each other is advantageous in that a more uniform action of the water thereon will be obtained. It is manifest that any number of series of blades may be mounted on the rotor shaft and that any number of blades may be employed in each series as may be desired. The rotation of the rotor shaft 6 as described operates to revolve the shaft 25 and the eccentric 26 thereon, thereby operating the pump 27 to compress air. It is manifest that the shaft may be employed for actuating any suitable mechanism. When it is desired to disengage the rotor from the drive shaft 25 the pin 23 is withdrawn out of engagement with the flanged collars 21 and 24 so that the rotor shaft 6 may revolve independent of the drive shaft 25.

What we claim is:

A current propelled rotor, comprising a rotor shaft, a plurality of horizontal radial arms mounted on said shaft, a blade pivoted on each arm, said blades curving diagonally from their inner upper ends to their outer lower ends, and having flanges on their sides and bottom edges, and adjustable stops on said arms for engaging the blades to limit their pivotal movement.

In witness that we claim the foregoing we have hereunto subscribed our names this 30th day of January, 1914.

CARL THROCKMORTON.
RAY THROCKMORTON.

Witnesses:
MARGUERITE BATES,
MARIE BATTEY.

Copies of this patent may be obtained for five cents each, by addressing the "Commissioner of Patents, Washington, D. C."